OUTPUT DETECTOR AND SCANNER

Filed July 24, 1964

*INVENTORS*
CHARLES W. LUNDBERG
FRANCIS J. BELCOURT
BY Griffin and Stokes United States Patent Office 3,316,425
Patented Apr. 25, 1967

3,316,425
OUTPUT DETECTOR AND SCANNER

Charles W. Lundberg, St. Paul, and Francis J. Belcourt, Shakopee, Minn., assignors to Sperry Rand Corporation, New York, N.Y., a corporation of Delaware Filed July 24, 1964, Ser. No. 384,865
15 Claims. (Cl. 307—88.5)

This invention broadly relates to novel means for detecting the presence or absence of electrical information on a plurality of different signal lines or conductors in order to provide the exact location of said information. More particularly, it concerns a novel branching gate which can be selectively set, according to an information input thereto, to either pass or impede an interrogating signal propagated along a transmission line thereto.

In many data processing operations, especially in the storage and retrieval of information from a memory matrix, any one of a plurality of output signal conductors may have generated thereon an active electrical signal indicative either of the absence or presence of certain information stored in a particular memory location associated with the output conductor. This is particularly true for a search memory function in determining whether or not specific information being sought is stored in one or more address locations, and if so, for identifying the specific locations wherein said information is stored. Where address generation is to be done serially for all memory locations in which information matches are found, means must be provided to sequentially scan the memory signal output conductors in order to determine those having or which had (or alternatively, those not having) an active signal indication thereupon. Briefly stated, therefore, one aspect of the present invention is the provision of a plurality of novel branching gates connected in series circuit along a transmission line, each of which serves to either inhibit or propagate each one of a group of sequentially applied electrical interrogate signals. These branching gates are located along predetermined intervals of the transmission line, with each gate including a semiconductor element in the form of a diode which, depending upon its forward or reverse biased state, presents either a low impedance or a high impedance to the interrogating pulse. This diode is connected to a transistor located in an alternate conducting path also selectively available to the interrogating pulse, with the interaction between these elements being such that the diode path is closed when the transistor path is open, and vice versa. The particular states of the diode and transistor are determined by a bistable element in the form of a tunnel diode for maintaining the gate in either one or the other of its conditions.

Therefore, one object of the present invention is to provide a novel two output solid state branching gate serving to selectively direct an interrogating signal either to one or the other of the gate outputs.

Another object of the invention is to provide a novel branching gate wherein the passage of an interrogating pulse via a first conducting path automatically resets the gate so that a succeding interrogation pulse will be passed via a second conducting path.

A further object of the present invention is to provide a novel solid state branching gate utilizing a tunnel diode as the bistable element therein for maintaining one of two pulse paths therethrough.

Still another object of the present invention is to provide a combination comprised of a plurality of said novel branching gates connected in series circuit for indicating the exact location of each of a plurality of output signals emanating in parallel from a source, such as a search memory.

These and other objects of the present invention will become apparent during the course of the following description, to be read in view of the drawings, in which.

Figure 1:
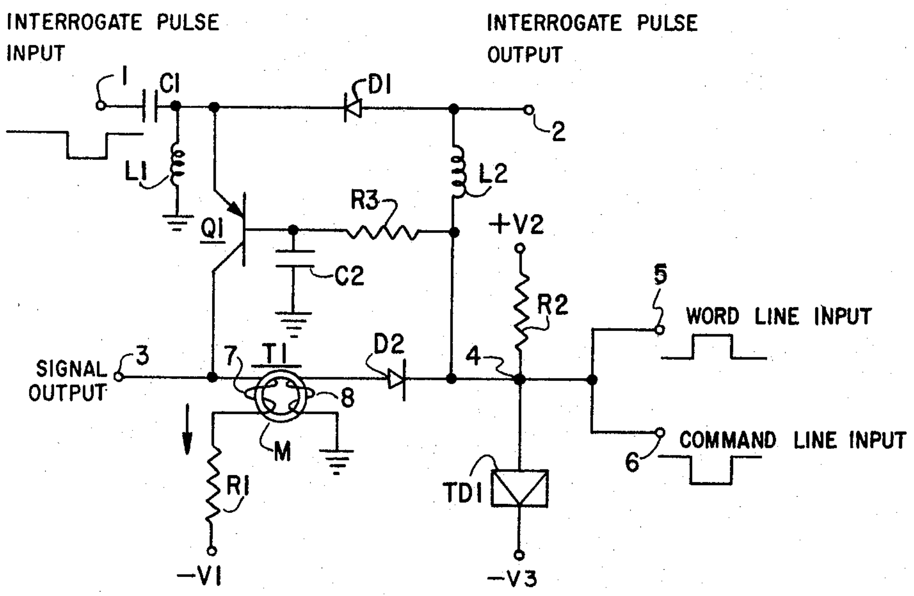
FIGURE 1 shows a circuit schematic of the novel branching gate.

One aspect of the present invention is the novel branching gate whose circuit schematic is illustrated in FIGURE 1. A backward diode D1 has its cathode connected to receive a negative going interrogate signal pulse which is applied thereto from an input terminal 1 via a coupling capacitor C1 used in turn to provide D.C. isolation between adjacent serially connected gates. The anode of diode D1 is connected to an interrogate pulse output terminal 2 at which the negative going interrogate pulse arrives only if diode D1 is in a forward biased (or low impedance condition), as determined by other components of the gate subsequently described. The emitter electrode of a PNP transistor Q1 is also connected to the cathode of diode D1. A reference bias potential for both the cathode of D1 and the emitter of Q1 can conveniently be circuit ground connected thereto through an inductor L1 used merely for A.C. isolation to avoid short circuiting the leading edge of the interrogate pulse. The collector electrode of transistor Q1 is connected to a reverse biasing potential —V1 through a transformer primary 7 and resistor R1, with another interrogate pulse output terminal 3 being taken from the said collector electrode. However, transistor Q1 only passes the negative going interrogate pulse to terminal 3 when its base electrode is held at a potential less than that of the emitter electrode potential.

A variable, two level biasing potential for both the base electrode of transistor Q1 and the anode of diode D1 is provided by a voltage divider arrangement comprised of a resistor R2 connected in series at junction 4 with a tunnel diode TD1. The upper end of resistor R2 is connected to a positive potential +V2, while the lower terminal of tunnel diode TD1 is connected to a negative potential —V3. It is the voltage appearing at said junction 4 which, when relatively high, prevents conduction in Q1 but permits conduction in D1, and vice versa when relatively low. Its particular magnitude is dependent upon the conducting state of tunnel diode TD1 which is a bistable element well known in the art. Such an element may be placed in a stable high voltage, high resistance condition by means of a temporarily applied positive pulse to its anode, which then makes relatively high the potential at junction 4. On the other hand, it may be placed in a stable low voltage, low resistance condition by application of a negative going pulse to said anode, whereupon the junction 4 voltage becomes low. When the branching gate is utilized in a series circuit combination with other branching gate for scanning and detecting search memory outputs or the like, two control signal input terminals 5 and 6 are provided each receiving a selectively applied pulse of different polarity. Terminal 5, for example, may be connected to a particular search memory signal output conductor whereon a positive pulse can selectively appear, while terminal 6 may be connected to a command line used to initially place tunnel diode TD1 into its low voltage state by application of a negative pulse. The FIGURE 1 circuit also provides means to automatically change the gate from a conducting path through Q1 to the other conducting path through D1 upon application thereto of an interrogate signal pulse at terminal 1. This feature is provided by intercoupling output terminal 3 with the tunnel diode TD1 using an inverting transformer T1, generally comprised of a ferrite core M having said primary winding 7 (in the aforedescribed series circuit with the collector of transistor Q1) and a secondary winding 8 one end of which is connected to circuit ground while to other end is connected to the anode of a semiconductor diode D2 whose cathode in turn is connected to junction 4 of the voltage dividing network. Transformer T1 is wound such that a decrease in current flow in the Q1 collector electrode causes a positive going signal to be applied via D2 to the anode of tunnel diode TD1 in order to switch same to its high voltage, high resistance state.

The base of transistor Q1 is connected to said junction 4 via a resistor R3, with a capacitor C2 being connected between the base and circuit ground to provide an A.C. path for transient signals and D.C. isolation for the base electrode. The biasing potential from junction 4 is applied to the anode of diode D1 through an inductor L2 which has two functions. First, L2 effectively makes output terminal 2 immune to any A.C. transient signals present elsewhere in the circuit other than the interrogate pulse applied to the cathode of diode D1. For example, the positive or negative pulse signals from terminals 5 and 6, or the positive signal from D2, cannot reach terminal 2. Second, inductor L2 prevents a negative going interrogate pulse at the anode of diode D1 (when forward biased) from being applied either to the base of transistor Q1 or to the cathode of diode D2 which, if allowed to occur, might act to place Q1 and/or D2 into conduction so as to give a false signal indication at output terminal 3. Furthermore, such a negative interrogate signal, if allowed to pass to junction 4 might also act to change TD1 from its high voltage state (which permits the forward biasing of D1) to its low voltage state and so erroneously place the gate into its stable Q1 conducting path.

While the values of individual components in the circuit of FIGURE 1 may be varied within a wide range, the following represent a typical embodiment but are not to be construed as limiting the scope of the present invention.

| | |
|---|---|
| D1 | IN1977 back diode. |
| D2 | FD100 diode. |
| TD1 | 5 ma. tunnel diode. |
| Q1 | 2N828 transistor. |
| T1 | 3:1 transformer. |
| R1 | 680 ohms. |
| R2 | 50K ohms. |
| R3 | 270 ohms. |
| C1 | .03 $\mu$f. |
| C2 | .03 $\mu$f. |
| L1 | 300 $\mu$h. |
| L2 | 300 $\mu$h. |

FIGURE 1 operates as follows. If tunnel diode TD1 is in its low voltage state, the potential at junction 4 is enough negative with respect to ground so as to reverse bias diode D1, i.e., hold its anode negative with respect to its cathode, to thus present a high impedance to any interrogate pulse applied to its cathode from terminal 1. This negative voltage from junction 4 is also applied to the base of transistor Q1 being further sufficient to place Q1 into conduction so as to provide a low impedance path between input terminal 1 and output terminal 3. Consequently, a negative going interrogate pulse tends to turn off Q1 and thus appears as a negative pulse at terminal 3 but not at terminal 2. Decreased current flow in the Q1 connector circuit also applies a positive pulse via T1 to junction 4 which thereupon switches tunnel diode TD1 to its high resistance condition. The voltage at junction 4 now rises to a value sufficient to forward bias diode D1, while at the same time turning off and thereby preventing conduction through transistor Q1. Any subsequently applied interrogate pulse to terminal 1 is therefore able to pass through diode D1 to output terminal 2, but is blocked by the non-conducting state of Q1 from appearing at terminal 3. An alternative way of placing TD1 into its high voltage state is by applying a positive pulse to terminal 5. This has the same effect upon the tunnel diode as does the positive reset pulse coming from transformer T1 and diode D2. When the tunnel diode is in its high resistance state, a negative input applied to terminal 6 will place it into its low resistance state, whereupon diode D1 presents a high impedance path to the next appearing interrogate pulse.

Figure 2:
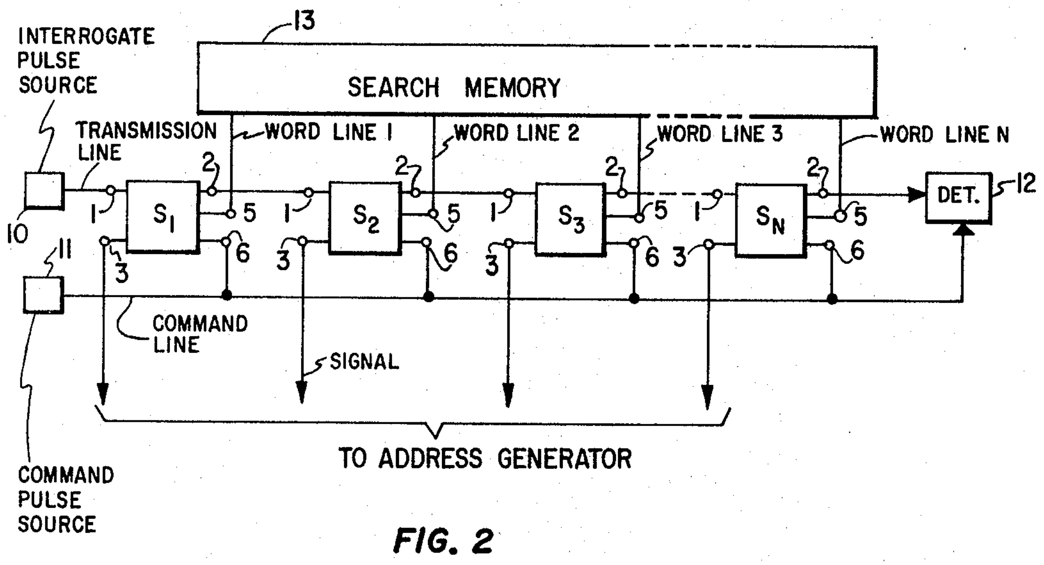
FIGURE 2 shows a novel circuit combination of a plurality of said novel branching gates used for sequentially scanning and detecting parallel signal outputs.

A plurality of the FIGURE 1 branching gates may be connected in series circuit, as shown in FIGURE 2, to provide a novel combination useful in sequentially scanning and providing successive output signals which in turn indicate the presence (or former presence) of a predetermined signal condition on each of a plurality of sense lines individual to a different gate. These branching gates are labelled $S_1$, $S_2$, $S_3$, $S_N$, the exact number depending upon the number of discrete outputs to be generated. The interrogate pulse input terminal 1 of each gate, except $S_1$, is connected to the interrogate pulse output terminal 2 of the preceding gate so as to form a single transmission line which includes all of the diodes D1 located at predetermined intervals therealong. An interrogate pulse source 10 is connected to input terminal 1 of the first gate $S_1$ in order to successively apply thereto a plurality of negative going interrogate pulses. A command pulse source 11 is connected via a command line to selectively apply a negative going pulse simultaneously to all gate input terminals 6. The output terminal 2 of the last branching gate $S_N$ is connected to some form of pulse detector, such as a tunnel diode, so that the end of the interrogating cycle can be indicated. The command pulse source 11 also can be connected to detector 12 to place it into a first state in readiness for receiving an interrogate pulse from gate $S_N$.

The input terminal 5 of each gate is connected to an individual output sense line coming from a data processing circuit 13 which is to be scanned. Said circuit 13 may have any one of a number of different functions, not part of the present invention, but for the purpose of describing the operation of the series combination of $S_1$, $S_2$, etc., circuit 13 is here assumed to be a search memory unit. In general, a search memory has a plurality of data word storage locations each adapted to hold a data word on which a search can be made according to some criterion. Usually, a predetermined search word is compared against all of the stored data words in order to find the location of those stored data words which are numerically equal to, less than, greater than, etc. said predetermined search word in accordance with some programmed search criterion. Where the criterion is met by a stored data word, a match condition is said to occur. In most search memories, especially those employing thin magnetic films as the storage elements, all data word storage locations are simultaneously searched according to the same criterion. If a match condition is found between the search word and the data word stored in any particular location, a word sense line associated with said particular storage location has some significant signal potential appearing thereon. Some search memories are constructed so that a match condition produces no active positive or negative potential whatsoever on the word line, whereas the finding of a mismatch condition does produce some active electrical signal of a predetermined polarity. In other search memories a match condition produces an active electrical signal pulse on a word line. For the purposes of this description, it is assumed that unit 13 of FIGURE 2 is one wherein a match condition produces no active signal output on a word line, but that a mismatch produces a positive going ulse on the word line such as is shown being applied to input terminal 5 in FIGURE 1.

Each output terminal 3 of the gates may be connected to some form of address generator circuit which is responsive to an output signal thereon for generating a multi-bit address uniquely identifying said terminal 3. Consequently since each terminal 3 is individually associated via its gate with a different one of the word lines, the addresses from the address generator can be made equivalent to the addresses of those search memory locations in which match conditions are found.

To fully understand the operation of FIGURE 2, the following sequence of events is set forth. The first step is to pulse all branching gates $S_1$, etc. with a negative going signal on the command line so as to place each tunnel diode TD1 into its low resistance-low voltage state. This means that each diode D1 of the interrogate transmission line is reverse biased so as to present a high impedance to any negative interrogating pulse propagating left to right from pulse source 10 to detector 12. Each transistor Q1 is now forward biased to present a low impedance between input terminal 1 and output terminal 3 of its gate. The second step of the operation is to operate the search memory unit 13 by circuitry not shown, and not part of the present invention. This produces positive going pulses on those word lines associated with memory locations wherein a mismatch condition occurs, i.e., in which the data word there stored does not compare with the search word according to the criterion used in conducting the search. Therefore, those branch gates S at whose terminals 5 positive signals appear, have their tunnel diodes TD1 switched to the high voltage state. On the other hand, the tunnel diodes in those gates S, on whose word lines no such positive signals appear, remain in the low voltage state. Assume, for example, that of those word lines shown in FIGURE 2, lines 1 and 3 have active positive signals produced thereon, while lines 2 and N remain undisturbed. In gate $S_1$, tunnel diode TD1 is therefore placed into a high voltage condition which forward biases its diode D1 while at the same time turning off its transistor Q1. This is also true for gate $S_3$. However, diodes D1 in gates $S_2$ and $S_N$ remain in a high impedance condition.

Step three of the operation is now to propagate the first of a group of interrogating pulses along the transmission line from interrogate pulse source 10. Said first interrogate pulse passes through the forward biased diode D1 in gate $S_1$ to appear on output terminal 2 thereof, from whence it goes to input terminal 1 of gate $S_2$. However, diode D1 in gate $S_2$ is reverse biased and thus presents a high impedance to the pulse at this location on the transmission line. Consequently, said first interrogate pulse fails to appear on output terminal 2 of gate $S_2$ but instead traverses the emitter-collector path of the $S_2$ transistor Q1 to now appear on output terminal 3, from whence it is applied to the address generator or some other utilization means. The address generator responds by generating the address of the search memory location associated with word line 2. Gate $S_2$ is automatically switched by this first interrogating pulse so that its tunnel diode TD1 is placed into its high resistance, high voltage state.

Since gate $S_2$ inhibits further propagation along the transmission line of the first interrogate pulse, detector 12 obviously remains unactivated. Interrogate pulse source 10 now supplies a second interrogate pulse which propagates through both gates $S_1$ and $S_2$ to input terminal 1 of gate $S_3$. Since gate $S_3$ has its tunnel diode TD1 set to the high voltage state, its diode D1 is in a low impedance state to thereby permit the application of said second interrogate pulse to the next serially connected gate $S_3$ (not shown). If it be here assumed that all gates $S_3$ through $S_{N-1}$ are in a low impedance state, this second interrogate pulse finally arrives at input terminal 1 of the last gate $S_N$ whose diode D1 is in its high impedance state. Thus, said second interrogate pulse fails to reach detector 12 since it is routed through the $S_N$ transistor Q1 to appear on output terminal 3 of gate $S_N$. $S_N$ further has its tunnel diode TD1 changed to a high voltage state so that a subsequently applied third interrogate pulse can propagate the entire length of the transmission line to impinge upon detector 12. This provides an indication that all search memory match conditions have been identified so that the search memory unit may commence a new cycle of operation.

The use of a transmission line as employed in the embodiment of FIGURE 2 should be construed as being a conductive path uniting the diodes D1 in a series connection. Furthermore, the design of each branching gate, with its diode D1, is such that considerations of line loss, delay, characteristic impedance, etc. are of relatively minor importance. Hence, the stages $S_1$, etc. can be located at any interval along the line so as to realize a unit with optimum speed, capacity, (more stages per unit) and compactness without detriment to the operational capabilities of the individual stages or of the unit as a whole. It should also be appreciated that the series combination of the branching gates as shown in FIGURE 2 may be utilized to scan and detect significant signal indications on a plurality of individual lines other than those emanating from a search memory. Furthermore, the branching gate of FIGURE 1 by itself constitutes a novel combination useful in many applications without the need for its incorporation into the series circuit of FIGURE 2. It is therefore obvious that many modifications and alterations may be made to the invention by those skilled in the art without departing from the principles defined in the appended claims.

What is claimed is:

1. Signal branching gate structure comprising:

(a) a first input terminal and first and second output terminals;

(b) a semiconductor diode with one electrode connected to said first input terminal and the other electrode connected to said first output terminal with said other electrode being responsive to either a first biasing potential or a second biasing potential for respectively inhibiting or permitting conduction through said diode;

(c) a three-electrode semiconductor switch element connected by two of its electrodes between said first input terminal and said second output terminal, with said switch element having a control electrode responsive to either said first biasing potential or said second biasing potential for respectively permitting or inhibiting conduction through said switch element:

(d) a series circuit for selectively providing said first or said second biasing potential said series circuit including a bistable tunnel diode; and (e) a first D.C. connection between said control electrode and a point intermediate said series circuit; a second D.C. connection between said diode other electrode and a point intermediate said series circuit, and a first control input terminal connected to said series circuit which is adapted to receive a signal for selectively placing said tunnel diode into at least one of its stable conducting states.

2. Gate structure according to claim 1 wherein said tunnel diode in its said one stable conducting state causes said first biasing potential to be applied to said control electrode and said diode other electrode, and which further includes a signal feedback circuit connected between said second output terminal and said series circuit for coupling a signal to said tunnel diode to place said tunnel diode into its other conducting state such that said second biasing potential is applied to said control electrode and said diode other electrode.

3. Gate structure according to claim 1 wherein said second D.C. connection includes an inductor.

4. Gate structure according to claim 2 which further includes a second control input terminal connected to said series circuit which is adapted to receive a signal for selectively placing said tunnel diode into said other conducting state.

5. Gate structure according to claim 1 wherein said diode one electrode and other electrode are its cathode and anode, respectively.

6. Signal branching gate structure comprising:

(a) a first input terminal and first and second output terminals;

(b) a semiconductor diode with its cathode connected to said first input terminal and its anode connected to said first output terminal;

(c) a PNP transistor with its emitter connected to said first input terminal, its collector connected to said second output terminal, and having a bypass capacitor connected between its base and a reference potential;

(d) a first biasing potential difference connected between said first input terminal and said second output terminal;

(e) a series circuit connected between a second biasing potential difference, said series circuit including a bistable tunnel diode;

(f) a D.C. connection between the base of said transistor and a point intermediate on said series circuit, and an inductor connected between the anode of said diode and said intermediate point; and (g) a first control input terminal connected to said series circuit which is adapted to receive a signal for selectively placing said tunnel diode into at least one of its stable conducting states.

7. Gate structure according to claim 6 wherein said tunnel diode has its anode comprising said intermediate point and its cathode is connected to the lower potential of said second biasing potential difference, with said first control terminal being connected to said tunnel diode anode.

8. Gate structure according to claim 7 which further includes a signal feedback circuit connected between said second output terminal and said tunnel diode anode.

9. Gate structure according to claim 8 wherein said signal feedback circuit includes a diode.

10. A signal branching gate system comprising: a transmission line for selectively propagating a predetermined polarity interrogating pulse which includes a plurality of signal branching gates serially connected together by a first input terminal and a first output terminal individual to each, where said signal branching gate comprises in combination a first semiconductor switch element connected between said gate first input terminal and said gate first output terminal; a second semiconductor switch element connected between said gate first input terminal and a second output terminal individual to said gate; control means having first and second conditions which is connected to both said gate first and said second switch elements for biasing the former to pass the interrogation signal while simultaneously biasing the latter to block said signal when in said first condition, and vice versa when in said second condition, with said gate control means including a bistable tunnel diode element and a control signal input terminal adapted to receive a control signal for selectively placing said gate control means into at least said second condition; and signal feedback means connected between said gate second output terminal and said gate control means to thereby couple a said interrogation signal from the former to the latter so as to place said gate control means into said first condition; where said system also includes a source of recurring interrogate pulses connected to the first input terminal of the first signal branching gate of the transmission line, and an interrogating pulse detector connected to the first output terminal of the last signal branching gate of the transmission line.

11. A system according to claim 10 wherein means common to all of said signal branching gates is further provided for simultaneously applying a signal to the control signal input terminal of each said gate in order to selectively place said control means of each into said second condition.

12. A system according to claim 11 wherein each signal branching gate further includes a second control signal input terminal connected to its said series circuit which is adapted to individually receive a signal for selectively placing said gate control means into said first condition.

13. A signal branching gate system comprising: a transmission line for selectively propagating a predetermined polarity interrogating pulse which includes a plurality of signal branching gates serially connected together by a first input terminal and a first output terminal individual to each, where each said signal branching gate comprises in combination a semiconductor diode with one electrode connected to said gate first input terminal and the other electrode connected to said gate first output terminal, with said other electrode being responsive to either a first biasing potential or a second biasing potential for respectively inhibiting or permitting conduction through said diode; a three-electrode semiconductor switch element connected by two of its electrodes between said gate first input terminal and a second output terminal individual to said gate, with said switch element having a control electrode responsive to either said first biasing potential or said second biasing potential for respectively permitting or inhibiting conduction through said switch element; a series circuit for selectively providing said first or said second biasing potential, said series circuit including a bistable tunnel diode and a first control input terminal connected thereto which is adapted to receive a signal for selectively placing said tunnel diode into at least one of its stable conducting states; a first D.C. connection between said control electrode and a point intermediate said series circuit, and a second D.C. connection between said gate diode other electrode and a point intermediate said series circuit; and signal feedback means connected between said gate second output terminal and said gate series circuit; where said system also includes a source of recurring interrogate pulses connected to the first input terminal of the first signal branching gate of the transmission line, and an interrogating pulse detector connected to the first output terminal of the last signal branching gate of the transmission line.

14. A signal branching circuit as claimed in claim 1 and further including:

(a) first and second sources of potential, said series circuit comprising a first impedance and said bistable tunnel diode connected in series between said first and second sources of potential;

(b) said first D.C. connection including a second impedance connected in circuit between said control electrode and a point in said series circuit intermediate said first impedance and said bistable tunnel diode;

(c) said second D.C. connection comprising a further impedance connected between said diode, other electrode and said point intermediate said first impedance and said bistable tunnel diode; and (d) said first control input terminal being connected to said point intermediate said first impedance and said bistable tunnel diode.

15. A signal branching circuit as claimed in claim 14 and further comprising:

(a) a transformer having first and second windings;

(b) a further diode;

(c) third and fourth sources of potential; and (d) said first transformer winding being connected between said second output terminal and said third source of potential and said second transformer winding being connected in series circuit with said further diode between said fourth source of potential and the point in said series circuit intermediate said first impedance and said bistable tunnel diode.

References Cited by the Examiner

UNITED STATES PATENTS

| | | | |
|---|---|---|---|
| 3,124,706 | 3/1964 | Alexander | 307—88.5 |
| 3,214,611 | 10/1965 | Chow | 307—88.5 |

ARTHUR GAUSS, *Primary Examiner.*

B. P. DAVIS, *Assistant Examiner.*